United States Patent
Ma et al.

(10) Patent No.: US 9,680,811 B2
(45) Date of Patent: Jun. 13, 2017

(54) METHOD AND SYSTEM FOR IMPLEMENTING THIRD-PARTY AUTHENTICATION BASED ON GRAY LIST

(75) Inventors: Xiaohang Ma, Shanghai (CN); Shanjing Tang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 229 days.

(21) Appl. No.: 14/113,233

(22) PCT Filed: May 22, 2012

(86) PCT No.: PCT/IB2012/001317
§ 371 (c)(1),
(2), (4) Date: Oct. 22, 2013

(87) PCT Pub. No.: WO2012/164400
PCT Pub. Date: Dec. 6, 2012

(65) Prior Publication Data
US 2014/0130138 A1    May 8, 2014

(30) Foreign Application Priority Data

May 27, 2011 (CN) .......................... 2011 1 0140318

(51) Int. Cl.
*H04L 29/06* (2006.01)
*H04W 12/06* (2009.01)
*H04W 76/02* (2009.01)

(52) U.S. Cl.
CPC .......... *H04L 63/08* (2013.01); *H04L 63/0869* (2013.01); *H04W 12/06* (2013.01); *H04L 65/1016* (2013.01); *H04W 76/02* (2013.01)

(58) Field of Classification Search
CPC ........................... H04L 63/08; H04L 63/0869
(Continued)

(56) References Cited

U.S. PATENT DOCUMENTS

| | | | |
|---|---|---|---|
| 6,674,756 B1 * | 1/2004 | Rao ..................... | H04L 12/4641 370/395.21 |
| 7,272,115 B2 * | 9/2007 | Maher, III .......... | H04L 41/5022 370/253 |

(Continued)

FOREIGN PATENT DOCUMENTS

| | | |
|---|---|---|
| CN | 101036366 | 9/2007 |
| CN | 101193068 | 6/2008 |

(Continued)

*Primary Examiner* — Harunur Rashid
*Assistant Examiner* — Shahriar Zarrineh
(74) *Attorney, Agent, or Firm* — Patti & Malvone Law Group, LLC

(57) ABSTRACT

A communication method and system for implementing third-party authentication is disclosed. The method includes the steps of receiving a service request from a requesting party; performing a third-party authentication on the service request according to a gray list and obtaining an authentication result; and processing the service request according to the authentication result. The system includes one or more processing elements, for example, user equipment (UE), Proxy Call Session Control Function (PCSCF), Service Call Session Control Function (SCSCF) and Application Server (AS) which cooperate to perform the disclosed method. The present invention implements a third-party control of services based on the gray list, and can effectively manage a variety of services in the communication system.

11 Claims, 6 Drawing Sheets

(58) Field of Classification Search
USPC .................................................. 726/4
See application file for complete search history.

(56) References Cited

U.S. PATENT DOCUMENTS

| | | | | |
|---|---|---|---|---|
| 7,603,697 | B1* | 10/2009 | Kupsh | H04L 12/5895 380/247 |
| 7,689,716 | B2* | 3/2010 | Short | H04L 63/08 709/217 |
| 7,849,324 | B1* | 12/2010 | Dharmarajan et al. | 713/185 |
| 7,920,594 | B2* | 4/2011 | Carlson | H04L 12/2602 370/395.21 |
| 8,014,273 | B1* | 9/2011 | Barrett | H04L 41/0896 370/210 |
| 8,396,807 | B1* | 3/2013 | Yemini | G06Q 10/06 705/400 |
| 8,582,564 | B2* | 11/2013 | Bae | H04L 12/6418 370/352 |
| 8,613,058 | B2* | 12/2013 | Beyer et al. | 726/5 |
| 8,713,641 | B1* | 4/2014 | Pagan | G06F 21/44 713/153 |
| 8,782,189 | B2* | 7/2014 | Akiyama | H04L 12/14 709/223 |
| 8,848,531 | B1* | 9/2014 | Breau | H04L 45/00 370/235 |
| 8,924,562 | B2* | 12/2014 | Sartini | G06F 9/50 709/217 |
| 8,959,238 | B2* | 2/2015 | Beyer | H04L 65/1016 370/325 |
| 8,984,615 | B2* | 3/2015 | Bhuyan et al. | 726/12 |
| 2003/0005133 | A1* | 1/2003 | Banerjee | G06Q 10/10 709/229 |
| 2003/0233583 | A1* | 12/2003 | Carley | 713/201 |
| 2005/0160298 | A1* | 7/2005 | Reno | G06Q 20/02 726/19 |
| 2005/0188205 | A1* | 8/2005 | Alasia | G06T 1/005 713/176 |
| 2005/0278384 | A1* | 12/2005 | Lin et al. | 707/200 |
| 2006/0021009 | A1* | 1/2006 | Lunt | H04L 12/585 726/4 |
| 2006/0168033 | A1* | 7/2006 | Cai | G06Q 10/107 709/206 |
| 2006/0224479 | A1* | 10/2006 | Bishop | G06Q 40/00 705/35 |
| 2007/0006291 | A1* | 1/2007 | Barari et al. | 726/10 |
| 2007/0056022 | A1* | 3/2007 | Dvir | 726/4 |
| 2007/0249323 | A1* | 10/2007 | Lee | G06F 21/33 455/411 |
| 2008/0120697 | A1* | 5/2008 | Beyer et al. | 726/4 |
| 2008/0216158 | A1* | 9/2008 | Imbimbo | H04L 63/00 726/4 |
| 2009/0010264 | A1* | 1/2009 | Zhang | H04L 47/2425 370/395.21 |
| 2009/0061863 | A1* | 3/2009 | Huggett | H04L 63/101 455/434 |
| 2009/0147936 | A1 | 6/2009 | Won | |
| 2009/0172782 | A1* | 7/2009 | Taglienti et al. | 726/4 |
| 2009/0201912 | A1* | 8/2009 | Minodier | H04L 63/08 370/352 |
| 2010/0077441 | A1* | 3/2010 | Thomas | G06F 3/1415 725/133 |
| 2011/0047593 | A1* | 2/2011 | Ausems | G06Q 20/0453 726/1 |
| 2012/0039452 | A1* | 2/2012 | Horn | H04L 63/083 379/188 |
| 2012/0079557 | A1* | 3/2012 | Patel et al. | 726/1 |
| 2013/0065606 | A1* | 3/2013 | Kurokawa | H04L 65/1006 455/456.1 |
| 2013/0268861 | A1* | 10/2013 | Bailey | G06F 9/5072 715/735 |

FOREIGN PATENT DOCUMENTS

| | | |
|---|---|---|
| CN | 101631298 | 1/2010 |
| CN | 102045310 | 5/2011 |
| KR | 20080069281 | 7/2008 |
| KR | 20100034289 | 4/2010 |
| WO | 2006094228 | 9/2006 |

* cited by examiner

METHOD AND SYSTEM FOR IMPLEMENTING THIRD-PARTY AUTHENTICATION BASED ON GRAY LIST

FIELD OF THE INVENTION

The present invention relates to a communication system, and more specifically, to a method and system using a gray list for third-party authentication in the communication system.

BACKGROUND OF THE INVENTION

Currently, white lists and black lists are widely used technology, which indicates a corresponding service request should be allowed or denied. For white lists and black lists, the behaviors of a system are predefined, whereby the white lists and black lists can be seen as predefined rules. In reality, the white list and black list rules are applied to a lot of systems or services, such as, operating system, firewall, antivirus software, mail systems, application software, voice call, data communications, data storage, etc. In general, the white list and black list rules are applied to almost all of the applications involving control. If a white list is established, then only users (or IP address, IP packet, mail, etc.) in the white list can obtain the grant of the system to get system services. For example, if a white list is established in a mail system, then mails of users in the white list will pass with priority, and will not be rejected as spam, with increasing security and convenience. If a black list is established, then users (or IP address, IP packet, e-mail, virus, etc.) listed in the black list cannot obtain the grant of the system. For example, in a communication operating system, if a certain user (for example, the user's identifier) is listed in a black list, then it may not be able to get a certain service or all services.

In the prior art, as in IP Multimedia Subsystem shown in FIG. 1, the system includes: User Equipment (UE), Proxy Call Session Control Function (PCSCF), Service Call Session Control Function (SCSCF) and Application Server (AS). User Equipment UE sends INVITE message M1 to PCSCF to initiate a service request. PCSCF sends INVITE message M2 to SCSCF, and then SCSCF sends INVITE message M3 to the AS. Application Server AS checks the white or black list, sends to the User Equipment a response which agrees to provide the service if the User Equipment is in the white list, and sends to the User Equipment a response which refuses to provide the service if the User Equipment is in the black list.

In reality, for certain types of services, whether the services should be provided is determined by the circumstances dynamically. Especially in the IP Multimedia Subsystem, which can offer various services in addition to traditional phone calls, such as, video sharing, unified messaging, unified communication, click-to-conference, multimedia collaboration kits, multiplayer game, friend and relative tracking, virtual PBX, security monitoring, outdoor work team efficiency, multimedia ring back tones, call shield, multimedia caller identification, intelligent call center routing, find-tracking and grouping search, or paid by a third party (the authenticating party), etc. For the above service request, sometimes, it is hard to meet requirements only to use the white and black lists to control. For example, in an instance needing service control by a third party, the white and black lists cannot implement third-party control of the services, and cannot implement real-time control of the services.

The latest practice has proposed a gray list between the black list and the white list. The gray list can intelligently perform service control, for example, it can intercept most of the spam. The gray list requires the service requesting party to re-send the just sent service request. For example, in an e-mail application, it requires the e-mail sender to wait a few minutes (the specific time can be set by the system automatically or by the administrator manually) before re-sending once the just sent e-mail. The gray list is based on the fact that the majority of service requests sent in the form of broadcast is usually sent only once, ignoring the request asking to re-send the service requests after a certain time interval. All service requests that are originally rejected by the application server and are required to be "later re-sent" will enter a gray list filter. If after 10 minutes (the specific time can be set by the system automatically or by the administrator manually), the service request is sent again by a remote server, it will pass without any obstacle, and thereafter a request consistent with this request sender will also pass smoothly.

However, the way hereinabove still has a problem that when a malicious attacker sends a service request again after a specified time, such as 10 minutes, then the system will put the malicious attacker into the white list, so that the system is still unable to accurately determine whether to provide the service to an unknown service requester. Moreover, when the requested service of the requester needs authentication from a third party, for example, the service is managed by a third party, the white and black lists cannot implement third-party authentication.

SUMMARY OF THE INVENTION

In order to solve the above problems, the present invention implements third-party authentication based on a gray list, and provides a method, system and computer program product.

According to a first aspect, the present invention provides a communication method, characterized in that, the method comprises:

receiving a service request from a requesting party;

performing a third-party authentication on the service request according to a gray list and obtaining an authentication result; and processing the service request according to the authentication result.

Wherein, the gray list includes at least the following three attributes: requesting party, authenticating party and service.

Wherein, performing the third-party authentication on the service request according to a gray list comprises: forwarding the service request from the requesting party to the authenticating party which authenticates the service request.

Wherein, processing the service request according to the authentication result comprises: providing the service to the requesting party when the authentication result is Accept; and not providing the service to the requesting party when the authentication result is Reject.

Preferably, when the service is not provided to the requesting party, a reject message is sent to the requesting party, in which a reject reason is described.

There is further comprised dynamically updating the gray list according to a request of the authenticating party.

Wherein, performing the third-party authentication on the service request according to a gray list comprises: performing an authentication of different service level on the service request.

Wherein, performing the third-party authentication on the service request according to a gray list comprises: performing an authentication on the service request by one or more third parties.

According to a second aspect, the present invention provides a communication system, characterized in that, the system comprises:

means for receiving a service request from a requesting party;

means for performing a third-party authentication on the service request according to a gray list and obtaining an authentication result; and means for processing the service request according to the authentication result.

Wherein, the gray list includes at least the following three attributes: requesting party, authenticating party and service.

Wherein, means for performing the third-party authentication on the service request according to a gray list and obtaining an authentication result comprises:

means for forwarding the service request from the requesting party to the authenticating party which authenticates the service request.

Wherein, means for processing the service request according to the authentication result comprises: means for providing the service to the requesting party when the authentication result is Accept; and means for not providing the service to the requesting party when the authentication result is Reject.

Preferably, when the service is not provided to the requesting party, a reject message is sent to the requesting party, in which a reject reason is described.

There is further comprised means for dynamically updating the gray list according to a request of the authenticating party.

Wherein, means for performing the third-party authentication on the service request according to a gray list and obtaining an authentication result comprises: means for performing an authentication of different service level on the service request.

Wherein, means for performing the third-party authentication on the service request according to a gray list and obtaining an authentication result comprises:

means for performing an authentication on the service request by one or more third parties.

According to a third aspect, the present invention provides a communication method, characterized in that, the method comprises:

receiving a service request from a calling party;

performing an authentication on the service request according to a gray list and obtaining an authentication result; and processing the service request according to the authentication result.

According to a fourth aspect, the present invention provides a computer program product comprising computer program codes stored on a computer-readable storage medium, which executes when the computer program codes are executed on a processor:

receiving a service request from a requesting party;

performing a third-party authentication on the service request according to a gray list and obtaining an authentication result; and processing the service request according to the authentication result.

Gray list is a new concept in telecommunication area, which can be widely used for various services that need third-party authentication. For example, parents can control web access for children in real time; a boss can control if an employee can access certain database/service/data in real time, etc. Although a black list can also be used in control, the black list cannot implement real-time control.

BRIEF DESCRIPTION OF THE DRAWINGS

The disclosed subject matter may be understood by reference to the following description in conjunction with the drawings, wherein the same reference signs denote the same elements, and wherein.

Figure 1:
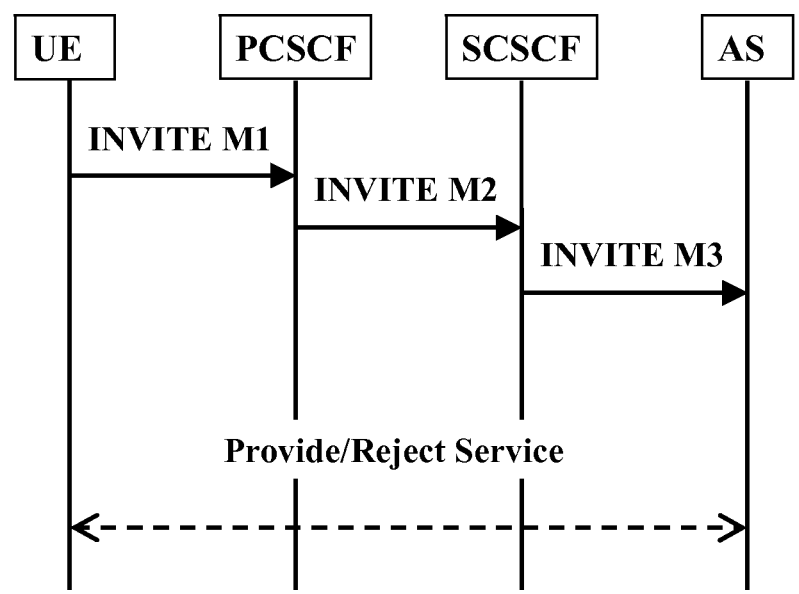
FIG. 1 shows a timing diagram of a service control according to a white list and a black list in the prior art.

Although the disclosed theme is likely to have various modifications and alternative forms, specific embodiments thereof have been described in detail herein and shown in examples in the drawings. However, it should be understood that the description of the specific embodiments herein is not to limit the disclosed theme to the disclosed particular form, and on the contrary, the present invention covers all modifications, equivalence and alternatives that fall within the scope of the appended claims.

DETAILED DESCRIPTION OF THE INVENTION

Exemplary embodiments for carrying out the invention are described now by reference to the drawings. However, the invention may be performed in various forms, not limited to the embodiments described herein. These embodiments are provided for extensively and comprehensively disclosing the invention, and for sufficiently conveying the extent of the invention to those skilled in the art. Terms in exemplary modes for carrying out the invention illustrated in the drawings do not define the invention. In the figures, identical units/elements are represented by identical reference signs.

Detailed exemplary modes for carrying out the invention are disclosed here. However, the specific constructions and function details disclosed here are only for the purpose of the typical description of the exemplary implementation of the invention. However, the present invention can be embodied in a variety of alternative forms and should not be constructed to be limited to implementations as set forth herein. Therefore, although the exemplary modes for carrying out the invention may have various modifications and substitutions, the specific modes for carrying out the invention therein are shown through examples in the drawings and will be described in detail here. However, it should be understood that it is not intended to limit the exemplary modes for carrying out the invention to the disclosed particular form; while on the contrary, the exemplary modes for carrying out the invention will cover all modifications, equivalence, and options that fall within the scope of the invention.

Unless otherwise stated, "a", "one", "said" and "the" used herein also include plural. In addition, it should be understood that terms used in the description, "include", "comprise" and/or "contain", specify some features, entities, steps, operations, units, and/or elements, but do not exclude one or more features, entities, steps, operations, units, elements and/or their groups. It should be understood that, when a unit is referred to being "connected" or "coupled" to another unit, it may be directly connected or coupled to another unit, or there may be an intermediate unit. In addition, the "connection" or "coupling" herein includes a wireless connection or coupling. The term "and/or" used herein includes any combination of and all combinations of one or more of the listed related items.

Unless otherwise stated, terms used herein (including scientific and technical terms) have common meaning generally understood by those skilled in the art. In addition, it can be appreciated that a term defined by a commonly used dictionary should be construed to have a meaning consistent with the context in the related are and should not be construed as an idealized or overly formal meaning.

Figure 2:
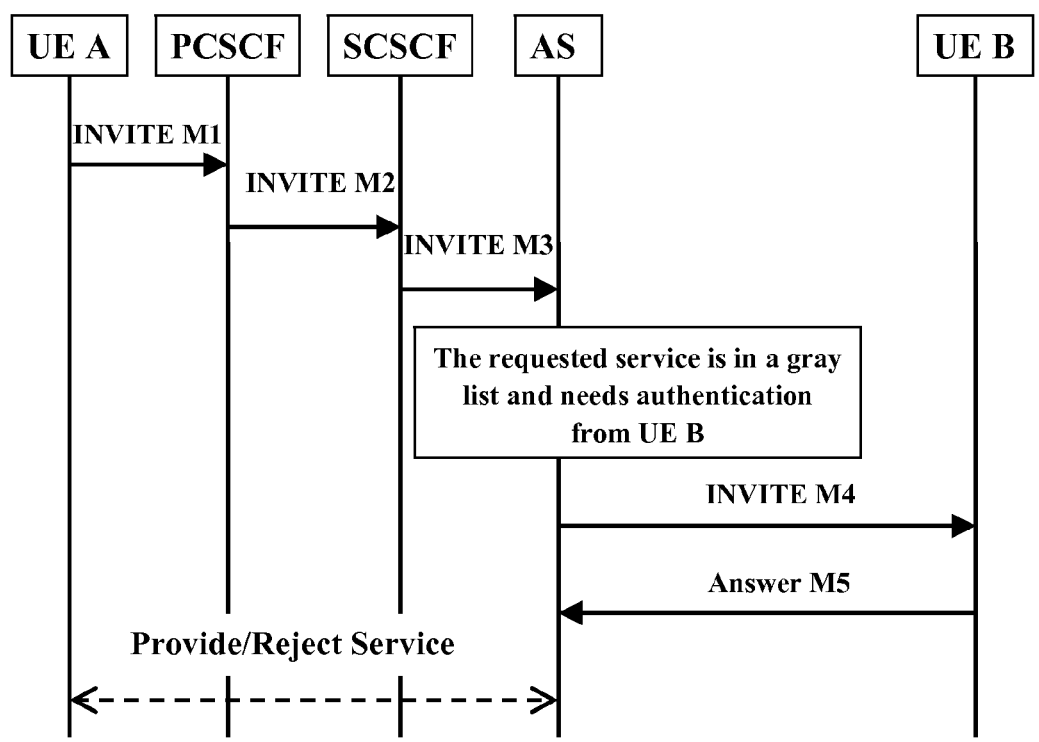
FIG. 2 shows a timing diagram of a third-party authentication using a gray list according to an embodiment of the invention.

FIG. 2 shows a timing diagram of a third-party authentication using a gray list according to an embodiment of the invention. For an illustrative purpose, an IP Multimedia Subsystem is described here as an example, and those of ordinary skill in the art should appropriate that the present invention can be applied to other communication systems. As shown in FIG. 2, the system includes: Proxy Call Session Control Function (PCSCF), Service Call Session Control Function (SCSCF), Application Server (AS), and User Equipment A (UE A) and User Equipment B (UE B).

In one preferred embodiment, a third-party authentication is implemented via a gray list in IMS. In IMS, besides voice service, there are a large number of additional services which play an important role. In one preferred embodiment, it is also very important to implement the control of the services in IMS. Preferably, the application server AS defines the gray list. The gray list is a predefined rule determined by the application server, and the gray list (or predefined rule) defines therein by which authenticating party a requested service of a requesting party should be authenticated. Preferably, the gray list (or predefined rule) may be one or more triples. In the present embodiment, the triple includes three attributes: requesting party, authenticating party, and service. Those of ordinary skill in the art should appropriate that the triple may also include more attributes. Wherein, the requesting party is the party initiating a service request; the authenticating party is a third party performing authentication on the above service request, and the authenticating party can determine whether to provide a certain service to a certain requesting party. For example, in FIG. 2, UE A is the requesting party and UE B is the authenticating party. The service may be: video sharing, unified messaging, unified communication, click-to-conference, multimedia collaboration kit, multiplayer game, friend and relative tracking, virtual PBX, security monitoring, outdoor work team efficiency, multimedia ring back tones, call shield, multimedia caller identification, intelligent call center routing, find-tracking and grouping search, or paid by a third party (the authenticating party), etc.

For the sake of clarity, FIGS. 2-5 simplify call flow in IMS, i.e., remove ACK messages and the like from the session. In addition, FIGS. 2-5 simplify some other equipments in IMS, and Interrogating Call Session Control Function (ICSCF), Home Subscriber Server (HSS), Domain Name Server (DNS) and the like in the figures are not described.

In the preferred embodiment, as shown in FIG. 2, User Equipment A sends INVITE message M1 to PCSCF to initiate a service request. Preferably, the service request can be included in the INVITE message. PCSCF sends INVITE message M2 to SCSCF, and then SCSCF sends INVITE message M3 to the application server. Upon receipt of the service request, the application server AS first determines the requesting party of the service request. In the present embodiment, the application server AS determines that the service requesting party is User Equipment A. Here, a variety of symbols, identifiers, etc. can be used to identify User Equipment A. The application server AS searches the gray list for User Equipment A. In the present embodiment, the gray list (or predefined rule) is one or more triples, the triple comprising at least three attributes, i.e., requesting party, authenticating party, and service. Preferably, the gray list (or predefined rule) can be expressed as a triple <Requesting Party, Authenticating Party, Service>. In the present embodiment, the requesting party in the gray list is User Equipment A, the authenticating party is User Equipment B, and the service is video sharing. Therefore, the gray list can be expressed as <User Equipment A, User Equipment B, Video Sharing>.

In one embodiment, when performing a search according to User Equipment A and/or video sharing, the application server obtains a gray list <User Equipment A, User Equipment B, Video Sharing>. In a preferred embodiment, the gray list may be stored on or outside the application server. In a preferred embodiment, the gray list may be stored in a database, or can be stored in a way of a file system and the like. The gray list indicates that an authentication from User Equipment B is needed when the service requested by User Equipment A is video sharing.

In a preferred embodiment, the application server puts the service request into INVITE message M4, and sends INVITE message M4 to User Equipment B. In another preferred embodiment, the application server forwards INVITE message M4 and SIP message header or parameters (e.g., SERVICE_TYPE=VIDEO SHARING, REQUEST_UE=UE A) to User Equipment B. The User Equipment B receives INVITE message M4, extracts the service request therein and performs third-party authentication according to the service request. Alternatively, User Equipment B receives INVITE message M4 and SIP message header or parameters, extracts the service request in the SIP message header or parameters, and performs third-party authentication according to the service request. In the preferred embodiment, if User Equipment B decides to accept the service request, it sends answer message M5, which indicates to accept the service, to the application server, and then the application server provides the service to User Equipment A; if User Equipment B decides to reject the service request, it sends answer message M5, which indicates to reject the service, to the application server, and then the application server refuses to provide the service to User Equipment A.

Figure 3:
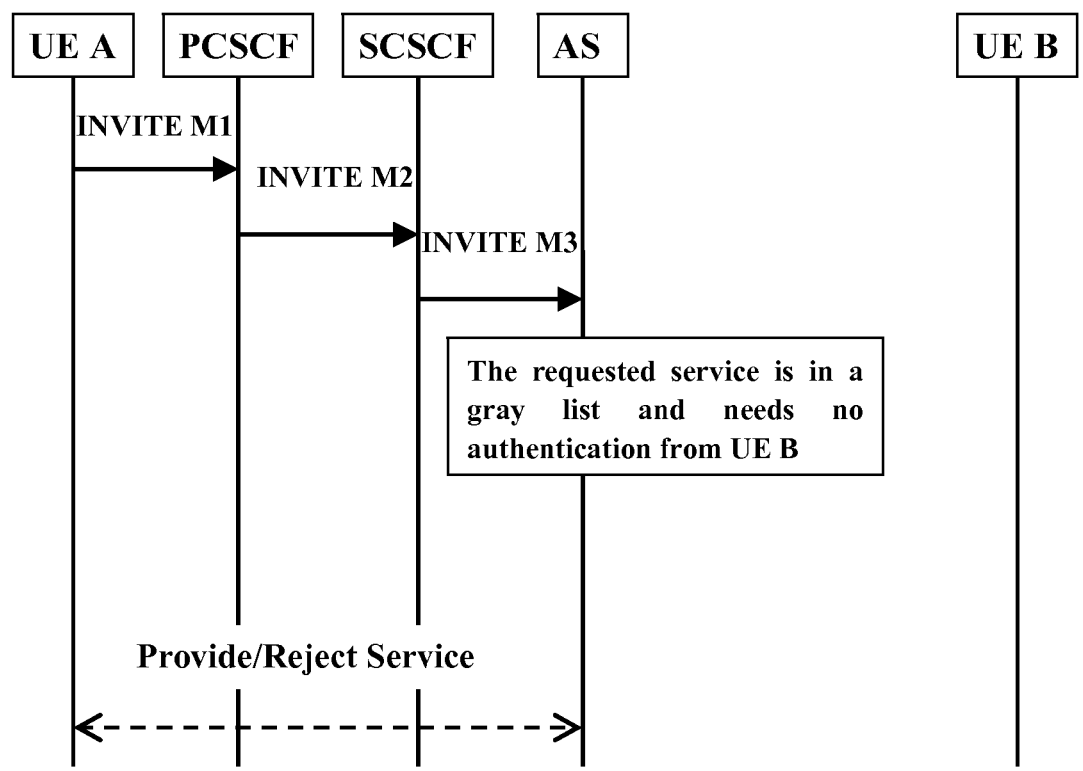
FIG. 3 shows a timing diagram of a third-party authentication using a gray list according to another embodiment of the invention.

FIG. 3 shows a timing diagram of a third-party authentication using a gray list according to another embodiment of the invention. In one preferred embodiment, the gray list of the present invention can include a white list and a black list. For example, when the authenticating party in the gray list which comprises requesting party, authenticating party and service is "NULL", it means there is no authenticating party. When the gray list comprises only requesting party and service, that is to say, the authenticating party is "NULL". It means there is no need for any third-party authentication. For example, when the gray list is expressed as <User Equipment A, NULL, Video Sharing>, the application server can provide the video sharing service to User Equipment A, without the need for the third-party authentication. At this point, User Equipment A is in the white list for the video sharing service. As it can be seen, the gray list of the present invention can include a white list.

When the gray list is <User Equipment A, NULL, Forbid Video Sharing>, the application server does not provide the video sharing service to User Equipment A, without the need for a third-party authentication. At this point, User Equipment A is in the black list for the video sharing service. As it can be seen, the gray list of the present invention can include a black list.

Further, when the gray list is expressed as <User Equipment A, NULL, All Services>, the application server can provide all services to User Equipment A, without the need for a third-party authentication. At this point, User Equipment A is in the white list for all services. When the gray list is expressed as <User Equipment A, NULL, Forbid All Services>, the application server does not provide any service to User Equipment A, without the need for a third-party authentication. At this point, User Equipment A is in the black list for all services. In addition, the gray list may also be expressed as <User Equipment A, NULL, Service Set 1>, <User Equipment A, NULL, Service Set 2>, etc., which means the application server can provide services in service set 1, service set 2 and the like to User Equipment A, without the need for a third-party authentication. Further, the gray list may also be expressed as <User Equipment A, NULL, Forbid Service Set 1>, <User Equipment A, NULL, Forbid Service Set 2>, etc., which means the application server can refuse to provide services in service set 1, service set 2 and the like to User Equipment A, without the need for a third-party authentication.

Figure 4:
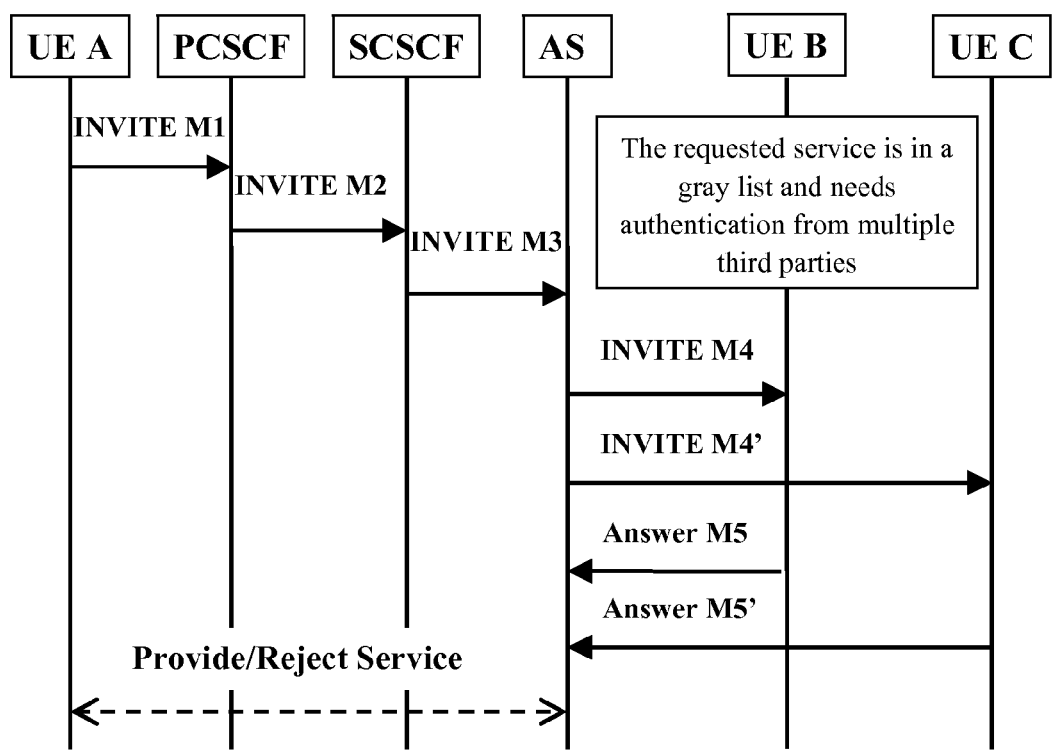
FIG. 4 shows a timing diagram of a third-party authentication using a gray list according to yet another embodiment of the invention.

FIG. 4 shows a timing diagram of a third-party authentication using a gray list according to yet another embodiment of the invention. The gray list according to the present invention supports authentication including multiple third parties. In many cases, the service request of the requesting party needs authentication from multiple third parties, and thus the gray list must support a multiple-third-party authentication. Preferably, multiple triples in the gray list may be used to implement multiple-third-party authentication. When User Equipment A requests for video sharing service, the application server retrieves multiple triples, such as <User Equipment A, User Equipment B, Video Sharing>, <User Equipment A, User Equipment C, Video Sharing> . . . <User Equipment A, User Equipment N, Video Sharing>, and then the application server should forward the service request to the above multiple third parties, respectively, i.e., User Equipment B, User Equipment C, . . . User Equipment N. The third-party authentication of video sharing service request by User Equipment A is performed by the above multiple third parties.

According to a preferred embodiment, in the case of the multiple-third-party authentication, only when all the third parties accept the service request of the requesting party, the application server provides the service to the requesting party. For example, only when all the above User Equipments B to N agree to provide the service to User Equipment A, the application server provides the service to User Equipment A. Alternatively, once any one of the third parties accepts the service request of the requesting party, the application server may provide the service to the requesting party. For example, once any one of the above User Equipments B to N agrees to provide the service to User Equipment A, the application server may provide the service to User Equipment A. Further, the authenticating party or the application server system may configure that when M (M is less than the total number of User Equipments of the authenticating parties) of all third parties accept the service request of the requesting party, the application server can provide the service to the requesting party. For example, when M (M is less than the total number of User Equipments for authenticating) of the above User Equipments B to N agree to provide the service to User Equipment A, the application server can provide the service to User Equipment A.

In a preferred embodiment, the authenticating party may send a request to add one or more authenticating parties, thereby implementing dynamic update of the gray list. For example, User Equipment B sends a request to the application server to add an authenticating party for the video sharing service of User Equipment A, for example, User Equipment C. Then, a triple <User Equipment A, User Equipment C, Video Sharing> is added into the gray list of the application servers. Thus, when User Equipment A initiates a video sharing service request to the application server, the application server forwards the service request to User Equipment B and User Equipment C.

Figure 5:
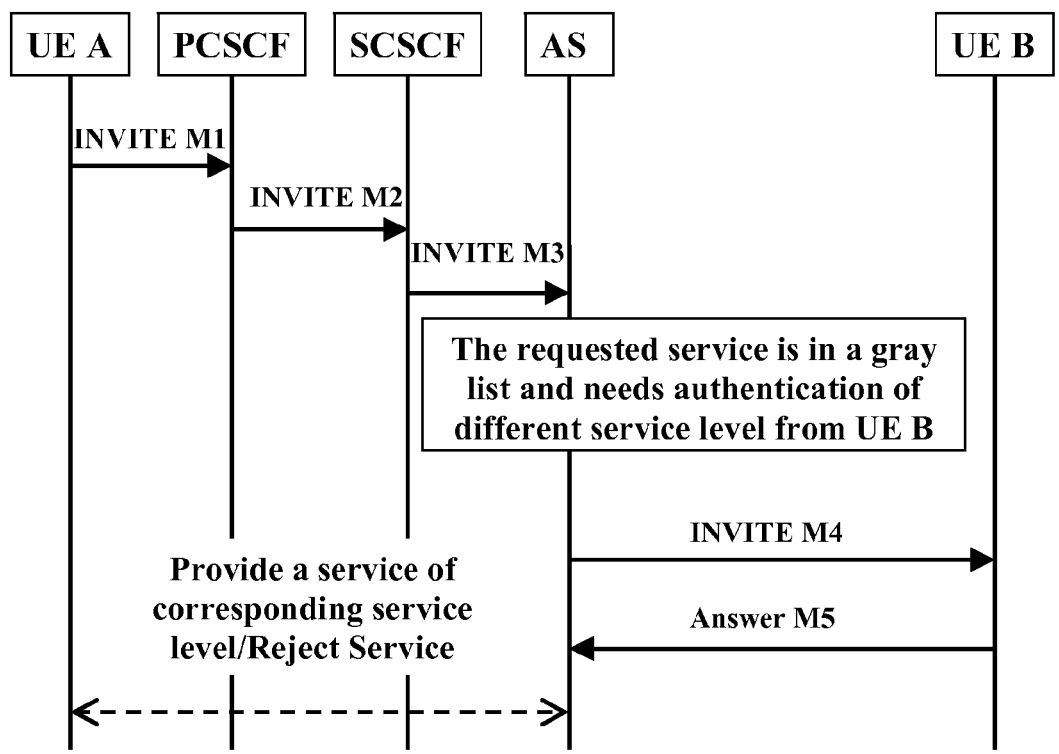
FIG. 5 shows a timing diagram of a third-party authentication using a gray list according to yet another embodiment of the invention.

FIG. 5 shows a timing diagram of third-party authentication using a gray list according to yet another embodiment of the invention. The gray list (or predefined rule) of the present invention includes, but not limited to, the following attributes: requesting party, authenticating party, and service. Preferably, the gray list (or predefined rule) may be one or more tetrads. In the present embodiment, the tetrad consists of four attributes: requesting party, authenticating party, service and service level. Wherein, the requesting party is the party initiating a service request; the authenticating party is a third party performing authentication on the above service request, and the authenticating party can determine whether to provide a certain service to a certain requesting party. For example, in FIG. 5, UE A is the requesting party and UE B is the authenticating party. The service may be: video sharing, unified messaging, unified communication, click-to-conference, multimedia collaboration kit, multiplayer game, friend and relative tracking, virtual PBX, security monitoring, outdoor work team efficiency, multimedia ring back tones, call shield, multimedia caller identification, intelligent call center routing, find-tracking and grouping search, or paid by a third party (the authenticating party), etc. The service level is the level of the service provided to the requesting party. Here, the description is made by example of using database access as the service, but those of ordinary skill in the art should appropriate that the examples of the service are not limited to database access.

In the preferred embodiment, as shown in FIG. 5, User Equipment A sends INVITE message M1 to PCSCF to initiate a service request. Preferably, the service request can be included in the INVITE message. PCSCF sends INVITE message M2 to SCSCF, and then SCSCF sends INVITE message M3 to the application server. Upon receipt of the service request, the application server AS first determines the requesting party of the service request. In the present embodiment, the application server AS determines that the service requesting party is User Equipment A. Here, a variety of symbols, identifiers, etc. can be used to identify User Equipment A. The application server AS searches the gray list for User Equipment A. In the present embodiment, the gray list (or predefined rule) is one or more tetrads, the tetrad comprising at least four attributes, i.e., requesting party, authenticating party, service and service level. Preferably, the gray list (or predefined rule) can be expressed as a tetrad <Requesting Party, Authenticating Party, Service, Service Level>. In the present embodiment, the requesting party in the gray list is User Equipment A, the authenticating party is User Equipment B, the service is database access, and the service level comprises read and write. For example, the gray list can be expressed as <User Equipment A, User Equipment B, Database Access, Write>.

In one embodiment, when performing a search according to User Equipment A and/or database access, the application server may obtain a gray list <User Equipment A, User Equipment B, Database Access, Read>. In another embodiment, when performing a search according to User Equipment A and/or database access, the application server may obtain a gray list <User Equipment A, User Equipment B, Database Access, Write>. In a preferred embodiment, the gray list may be stored on or outside the application server. In a preferred embodiment, the gray list may be stored in a database, and may also be stored in a way of a file system and the like. The gray list indicates that when the service requested by User Equipment A is database access, an authentication from User Equipment B is needed and User Equipment B may grant database read or write by User Equipment A.

In a preferred embodiment, the application server puts the service request into INVITE message M4, and sends INVITE message M4 to User Equipment B. In another preferred embodiment, the application server forwards INVITE message M4 and SIP message header or parameters (e.g., SERVICE_TYPE=DATABASE ACCESS, REQUEST_UE=UE A) to User Equipment B. The User Equipment B receives INVITE message M4, extracts the service request therein and performs a third-party authentication according to the service request. Alternatively, User Equipment B receives INVITE message M4 and SIP message header or parameters, extracts the service request therein, and performs third-party authentication according to the service request.

In the preferred embodiment, if User Equipment B decides to reject the service request, it sends answer message M5, which indicates to reject the service, to the application server, and then the application server refuses to provide the service to User Equipment A In the preferred embodiment, if User Equipment B decides to accept the service request, it sends answer message M5, which indicates to accept the service, to the application server. If the retrieved gray list defines <User Equipments A, User Equipment B, Database Access, Read>, then the application server can only grant database access by User Equipment A (i.e., User Equipment A can only read data, but can not modify, delete or add data). If the retrieved gray list defines <User Equipment A, User Equipment B, Database Access, Write>, the application server can grant database write by User Equipment A (i.e., User Equipment A can not only read but also modify, delete or add data).

In a preferred embodiment, the primary/first authenticating party may send a request to delete/modify one or more other authenticating parties in the gray list (i.e., non-primary/first authenticating parties). For example, the requesting party is User Equipment A, and the authenticating parties are User Equipments B, C and D, wherein User Equipment B is the primary/first authenticating party. User equipment B can send a request to delete User Equipment C so that the authenticating parties change to User Equipments B and D.

Also, User Equipment B can send a request to change User Equipment C to User Equipment E so that the authenticating parties change to User Equipments B, D and E.

In a preferred embodiment, the primary/first authenticating party may send a request to modify service levels that can be granted by other authenticating parties (i.e., non-primary/first authenticating parties) in one or more gray lists. For example, the requesting party is User Equipment A, and the authenticating parties are User Equipments B and C, the service is database access, and the service level includes read and write, wherein User Equipment B is the primary/first authenticating party. The gray list for User Equipment C is <User Equipment A, User Equipment C, Database Access, Write>. At this point, User equipment B can send a request to modify the authorization level of User Equipment C to "read", so that the gray list for User Equipment C changes to <User Equipment A, User Equipment C, Database Access, Read>.

Figure 6:
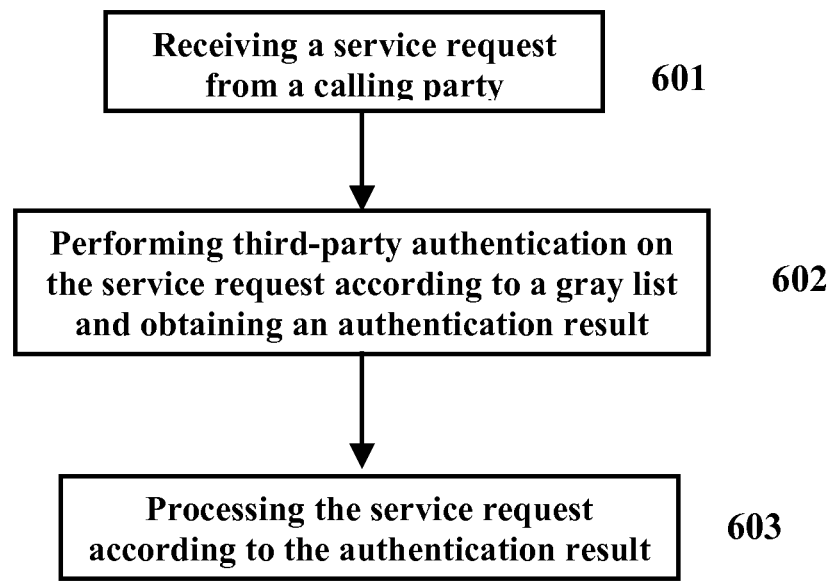
FIG. 6 shows a flow chart of a method for implementing third-party authentication based on the gray list according to a preferred embodiment of the invention.

FIG. 6 shows a flow chart of a method of implementing a third-party authentication based on the gray list according to a preferred embodiment of the invention. At 601, a service request from the requesting party is received. Wherein, the requesting party is the party initiating the service request, and may be personal computer, laptop computer, personal digital assistant s and the like. Preferably, the requesting party may be User Equipment A as shown in FIG. 2. User Equipment A sends INVITE message M1 to PCSCF to initiate the service request. Preferably, the service request can be included in the INVITE message. PCSCF sends INVITE message M2 to SCSCF, and then SCSCF sends INVITE message M3 to the application server.

At 602, a third-party authentication is performed on the service request according to the gray list (predefined rule), and an authentication result is obtained. Wherein, the third-party authentication is performed by the authenticating party, which is the third party authenticating the above service request and can determine whether to provide a certain service to the requesting party. Upon the receipt of the service request, the application server AS determines the requesting party of the service request. The application server AS searches the gray list according to the requesting party and/or service name. For example, the gray list <Requesting Party, Authenticating Party, Service> might be searched. The application server puts the service request into INVITE message M4 and sends it to the authenticating party. The authenticating party receives INVITE message, extracts the service request therein and performs third-party authentication according to the service request. The authenticating party sends the authentication result to the application server. In another preferred embodiment, the application server forwards INVITE message M4 and SIP message header or parameters to the authenticating party.

At 603, the service request is processed according to the authentication result. If the authentication result is the authenticating party decides to accept the service request, it sends answer message, which indicates to accept the service, to the application server, and then the application server provides the service to the requesting party; if the authentication result is the authenticating party decides to reject the service request, it sends answer message, which indicates to reject the service, to the application server, and then the application server refuses to provide the service to the requesting party.

Preferably, when the authenticating party in the gray list is "NULL", it means there is no need for any third-party authentication. For example, when the gray list is expressed as <User Equipment A, NULL, Video Sharing>, the application server can accept/reject the service request from User Equipment A, without the need for third-party authentication. At this point, the above method becomes a method of non-third-party authentication, i.e., receiving a service request of a calling party; performing authentication on the service request according to a gray list and obtaining an authentication result; and processing the service request according to the authentication result.

Gray list is a new concept in telecommunication area, which can be widely used for various services that need third-party authentication. The gray list of the present invention is not limited to the triple comprising three attributes or the tetrad comprising four attributes, but can be expanded to a multi-tuple comprising more attributes according to needs. The expansion of the gray list may be done according to the requirements of the system. The gray list can be widely used various applications of third-party authentication, for example, parents can control web access for children in real time; a boss can control if his employee can access certain database/service/data in real time, etc. Although a black list can also be used in control, the black list cannot implement real-time control.

Meanwhile, it is noted that, typically, software implementing aspects of the disclosed theme is coded in some form of program storage medium, or is performed on some type of transportation medium. The program storage medium may be magnetic (e.g., floppy disk or hard drive) or optical (e.g., Compact Disk Read Only Memory or "CD-ROM"), and may be read-only or random access. Similarly, the transportation medium may be twisted pair, coaxial cable, fiber, or some other appropriate transportation medium in the prior art. The disclosed theme is not limited to these aspects of any given implementation. Computer-readable medium with instructions stored thereon, such as DVD, CD-ROM, floppy disk, or memory (for example, non-volatile memory) is further provided, and steps of the above method are executed when the instructions are executed by the processor.

The above disclosed specific embodiments are only illustrative, and the disclosed theme can be modified and implemented in a different but equivalent way that is obvious to those skilled in the art benefiting from the teaching herein. In addition, it is not desired to limit detailed construction or design shown here, but as described by the following claims. It is therefore important that the specific embodiments disclosed hereinabove may be changed or modified, and all changes are considered to fall within the scope of the disclosed theme. Thus, the scope of protection herein is set forth as in the following claims.

The invention claimed is:

1. A communication method executed in an application server in an IP Multimedia System (IMS) network, comprising:
   receiving a service request from a requesting party in the IMS network;
   performing a third-party authentication by a first authenticating party in the IMS network on the service request according to a gray list and obtaining an authentication result, wherein the gray list includes at least the following three attributes: requesting party, authenticating party and service;
   processing the service request by the first authenticating party according to the authentication result; and
   receiving a request from a second authenticating party in the IMS network to modify a service level granted to the requesting party; and
   further comprising dynamically updating the gray list according to a request of any authenticating party.

2. The method according to claim 1, wherein, performing the third-party authentication on the service request according to a gray list comprises: forwarding the service request from the requesting party to the authenticating party which authenticates the service request.

3. The method according to claim 1, wherein, processing the service request according to the authentication result further comprises: providing the service to the requesting party when the authentication result is Accept; and not providing the service to the requesting party when the authentication result is Reject.

4. The method according to claim 1, wherein, performing the third-party authentication on the service request according to a gray list comprises: performing sending an authentication of different service levels on the service request.

5. The method according to claim 1, wherein, performing the third-party authentication on the service request according to a gray list comprises: performing an authentication on the service request by one or more third parties.

6. A communication system including a non-transitory computer-readable storage device storing computer-executable instructions which, when executed by a processor of a computing device in an IP Multimedia System (IMS) network, configure the processor to:
   receive a service request from a requesting party in the IMS network;
   perform a third-party authentication by a first authenticating party in the IMS network on the service request according to a gray list and obtaining an authentication result, wherein the gray list includes at least the following three attributes: requesting party, authenticating party and service;
   process the service request by the first authenticating party according to the authentication result; and
   modify a service level granted to the requesting party in response to a request from a second authenticating party in the IMS network;
   wherein the processor is further configured to dynamically update the gray list according to a request of any authenticating party.

7. The system according to claim 6, wherein the processor is further configured to perform the third-party authentication on the service request by forwarding the service request from the requesting party to the authenticating party which authenticates the service request.

8. The system according to claim 6, wherein the processor is further configured to: process the service request according to the authentication result by:
   providing the service to the requesting party when the authentication result is Accept;
   and
   not providing the service to the requesting party when the authentication result is Reject.

9. The system according to claim 6, wherein the processor is further configured to perform third-party authentication on the service request-according to a gray list and obtaining an authentication result: by performing an authentication of different service levels on the service request.

10. The system according to claim 6, wherein the processor is further configured to perform the third-party authentication on the service request according to a gray list and obtaining an authentication result by performing an authentication on the service request by one or more third parties.

11. A communication method executed in an application server in an IP Multimedia System (IMS) network, the method comprising:
- receiving at a first authenticating party in the IMS network a service request from a calling party;
- performing an authentication on the service request according to a gray list and obtaining an authentication result, wherein the gray list includes at least the following three attributes: requesting party, authenticating party and service;
- processing the service request according to the authentication result;
- modifying a service level granted to the calling party in response to a request from a second authenticating party in the IMS network; and
- further comprising dynamically updating the gray list according to a request of any authenticating party.

* * * * *